(12) United States Patent
Yamaguchi

(10) Patent No.: US 9,195,417 B2
(45) Date of Patent: Nov. 24, 2015

(54) AUTOMATIC LOGOUT DEVICE AND AUTOMATIC LOGOUT METHOD

(71) Applicant: KYOCERA Document Solutions Inc., Osaka (JP)

(72) Inventor: Hirofumi Yamaguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/630,565

(22) Filed: Feb. 24, 2015

(65) Prior Publication Data
US 2015/0242167 A1    Aug. 27, 2015

(30) Foreign Application Priority Data

Feb. 26, 2014 (JP) ................................ 2014-035074

(51) Int. Cl.
*G06F 15/00* (2006.01)
*G06F 3/12* (2006.01)
*H04N 1/00* (2006.01)

(52) U.S. Cl.
CPC ............ *G06F 3/1222* (2013.01); *G06F 3/1238* (2013.01); *H04N 1/00838* (2013.01); *H04N 2201/0094* (2013.01)

(58) Field of Classification Search
CPC . G06F 3/1222; G06F 3/1238; H04N 1/00838; H04N 2201/0094
USPC ....................................................... 358/1.14
See application file for complete search history.

(56) References Cited

U.S. PATENT DOCUMENTS

2008/0144071 A1*  6/2008  Uchikawa .......... H04N 1/00915
                                                          358/1.14

FOREIGN PATENT DOCUMENTS

| JP | H 6-124188 A | 5/1994 |
| JP | 2000-222059 A | 8/2000 |

* cited by examiner

*Primary Examiner* — Saeid Ebrahimi Dehkordy
(74) *Attorney, Agent, or Firm* — Stein IP, LLC

(57) ABSTRACT

The operation decision unit decides whether a user operation exists or not on the electronic apparatus when a user instructing a job did not log out from the apparatus after the end of the job. The terminal device decision unit decides whether the user operation exists or not on the user terminal device when it is decided that the user operation does not exists on the electronic apparatus. The authentication unit makes the user log out from the electronic apparatus when it is decided that the user operation exists on the user terminal device.

10 Claims, 6 Drawing Sheets

| PRIVATE PRINT JOB | IDENTIFICATION INFORMATION |
|---|---|
| DOCUMENT A | AAA |
| ... | ... |

500
501
502

100
200
LOG-IN

| USER IDENTIFICATION INFORMATION | TERMINAL IDENTIFICATION INFORMATION |
|---|---|
| AAA | 1111AAAA |
| ... | ... |

AUTOMATIC LOGOUT DEVICE AND AUTOMATIC LOGOUT METHOD

CROSS-REFERENCE TO RELATED APPLICATIONS

This application claims the benefit of Japanese Patent Application No. 2014-035074, filed on Feb. 26, 2014, all of which is hereby incorporated by reference in its entirety.

BACKGROUND

The present disclosure relates to automatic logout device and automatic logout method.

In recent years, a using form wherein a plurality of terminal devices shares one image forming apparatus is becoming popular. Such image forming apparatus is provided with a private print function for security reasons. Specifically, after a user sends print data from a specific terminal device to a common image forming apparatus, he goes to the image forming apparatus and executes the user authentication using an IC card, and so on. When the image forming apparatus authenticates the user and allows the user to log in, the print data thus sent is printed out. Hereby, the printed papers are not seen by the other person and it is possible to prevent from leaving the printed papers for a long time.

At using the private print function, there is a possibility that the user does not log out and takes the printed papers away from the image forming apparatus though he gave attention to the login operation. When the image forming apparatus is left as it is without the logout operation, the login state that the user does not wish is continued for a long time, and there is a problem that the security cannot be ensured.

In order to settle the above problem, there is an image forming apparatus including a user existence deciding unit for emitting an infrared light and detecting a user existing near the apparatus based on a reflected light from the user. The apparatus further includes a central control unit for controlling an external program execution unit and a device control unit in order to gradually control a power saving function, a device protection function, and a security function based on information from the user existence deciding unit whether or not the user exists.

There is also an information processing apparatus wherein an authorized user is carrying a wireless tag, a reading unit detects the wireless tag when a distance between the user and the apparatus is less than a specific threshold value, and not detect the wireless tag when the distance between the user and the apparatus is more than the specific threshold value. The apparatus further includes a control unit for permitting and prohibiting an input from an input unit based on the detection result of the wireless tag. Hereby, it is possible to continuously authenticate the user, certainly protect the data, and simplify the operations.

In the abovementioned conventional techniques, however, the apparatus requires special equipment like the user existence deciding unit for emitting the infrared light or the wireless tag, which increases the cost of the apparatus. This is a problem, too. In such apparatus, since the logout is executed by deciding whether or not the user exists in a specific range around the image forming apparatus, there is a possibility that the logout is unintentionally executed even when the user is apart from the apparatus in a short time during the operation, and the convenience of user friendliness is impaired.

SUMMARY

According to one aspect of the present disclosure, an automatic logout device installed in an electronic apparatus connecting with a user terminal device via network includes an operation decision unit, a terminal device decision unit and a user authentication unit.

The operation decision unit is configured to decide whether a user operation exists or not on the electronic apparatus when a user instructing a job did not log out from the electronic apparatus after the job ended by the electronic apparatus. The terminal device decision unit is configured to decide whether the user operation exists or not on the user terminal device when it is decided that the user operation does not exists on the electronic apparatus. The authentication unit is configured to make the user log out from the electronic apparatus when it is decided that the user operation exists on the user terminal device.

According to another aspect of the present disclosure, an automatic logout device installed in an image forming apparatus connecting with a user terminal device via network includes a user authentication unit, a job control unit, a job execution unit, an operation decision unit, and a terminal device decision unit.

The user authentication unit is configured to allow a user to log in the image forming apparatus when user identification information and password inputted from an operation unit of the image forming apparatus by the user are identical with registered user identification and password. The job control unit is configured to decide whether or not the user identification of the login user corresponds to the registered user identification information of a private print job temporally stored in a memory. The job execution unit is configured to execute the private print job when the user identification information of the login user corresponds to the registered user identification information of the private print job. The operation decision unit is configured to decide whether a user operation exists or not on the image forming apparatus when the user instructing the private print job did not log out from the image forming apparatus after the private print job ended by the image forming apparatus. The terminal device decision unit is configured to decide whether the user operation exists or not on the user terminal device when it is decided that the user operation does not exists on the image forming apparatus. The authentication unit is configured to make the user log out from the image forming apparatus when it is decided that the user operation exists on the user terminal device.

According to still another aspect of the present disclosure, an automatic logout method for an electronic apparatus connecting with a user terminal device via network includes an operation decision step, a terminal device decision step, and a user authentication step. The operation decision step is configured to decide whether a user operation exists or not on the electronic apparatus when a user instructing a job did not log out from the electronic apparatus after the job ended by the electronic apparatus. The terminal device decision step is configured to decide whether the user operation exists or not on the user terminal device when it is decided that the user operation does not exists on the electronic apparatus. The authentication step is configured to make the user log out from the electronic apparatus when it is decided that the user operation exists on the user terminal device.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

An embodiment of automatic logout device in the present disclosure is explained hereinafter with reference to attached drawings, in order to understand the present disclosure. Besides, the embodiment described herein is only exemplary and should not be considered as limiting the technical scope of the present disclosure. In the flowchart, an alphabet "S" in front of a numeral means "a step".

Figure 1:
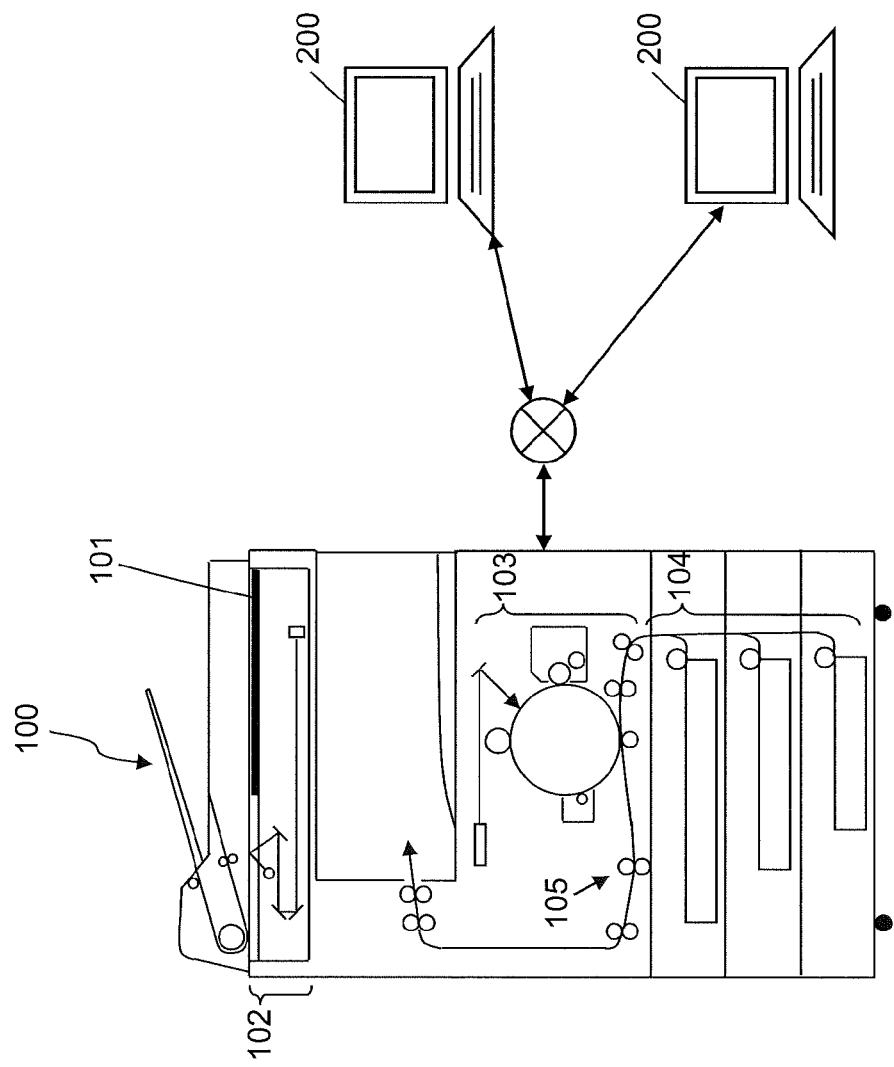
FIG. 1 is a schematic view of a multifunction peripheral in which an automatic logout device is installed, in accordance with an embodiment of the present disclosure.

As an example of an electronic apparatus including the automatic logout device in accordance with the embodiment of the present disclosure, an image forming apparatus wherein the user authentication can be performed is explained hereinafter. The units that do not have direct relation to the present disclosure are explained briefly, and the detailed explanation is omitted. The image forming apparatus in the present disclosure corresponds to a multifunction peripheral provided with a copier function, a scanner function, and a printer function, for example.

Where a user executes a print job, a working of the multifunction peripheral (MFP) 100 is explained briefly as shown in FIG. 1.

First, at using the multifunction peripheral 100, a user sends a print job including image data from a user terminal device 200 to the multifunction peripheral 100 via network. The multifunction peripheral 100 stores the print job in a specific memory being associated with user identification information of the user The user goes to the multifunction peripheral 100 and the user executes the user authentication by means of an operation unit 101 (an operation panel). After that, the multifunction peripheral 100 executes the print job corresponding to the user identification information.

Besides, when the user brings an original to the multifunction peripheral 100, the multifunction peripheral 100 reads image data of the original by an image reading unite 102 provided to the multifunction peripheral 100.

At executing the print job, the multifunction peripheral 100 activates an image forming unit 103. The image forming unit 103 forms a toner image corresponding to the image data on a photosensitive drum by means of a charging unit, an exposing unit, and a developing unit, and transfers the toner image on a conveyed recording medium (for example, a paper or a sheet) by means of a transfer unit.

The multifunction peripheral 100 includes a conveyance unit 104 for conveying a paper corresponding to the print job from a paper feed cassette and a fixing unit 105 for fixing the toner image on the paper, and drives the conveyance unit 104 and the fixing unit 105 cooperating with the image forming unit 103.

The paper on which the toner image was fixed is ejected as a printed matter. The multifunction peripheral 100 executes the print job in this manner.

Figure 2:
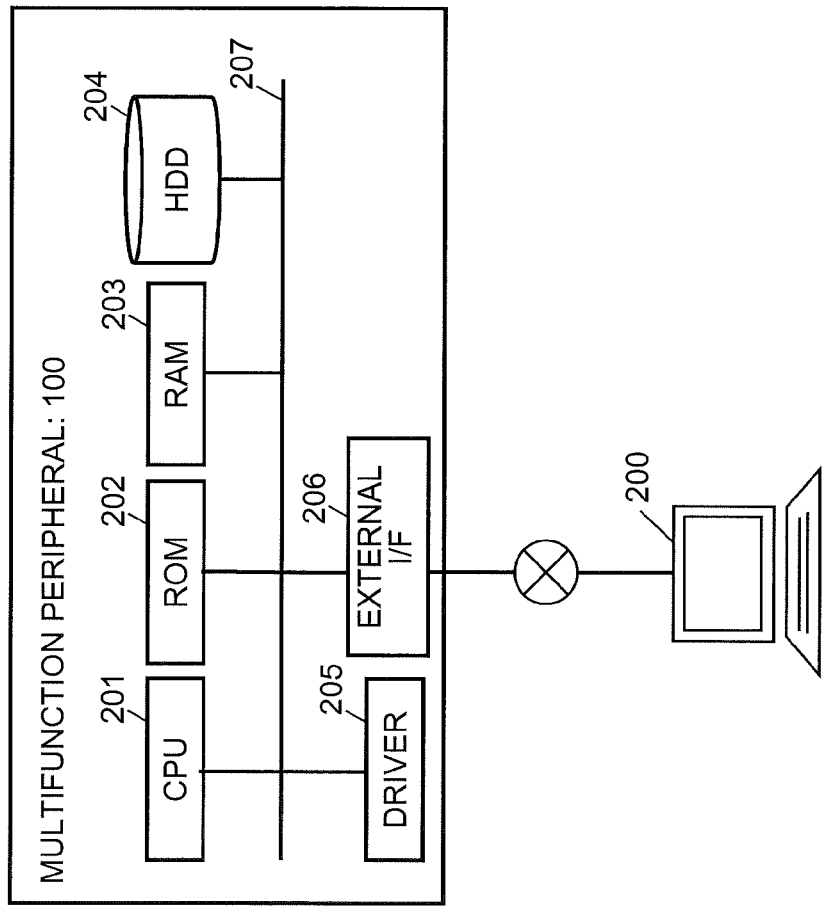
FIG. 2 is a diagram indicating a structure of control system hardware of the multifunction peripheral in accordance with an embodiment of the present disclosure.

Next, the structure of control system hardware in the multifunction peripheral 100 is explained according to FIG. 2. The units that do not have direct relation to the present disclosure are explained briefly.

As shown in FIG. 2, a control circuit of the multifunction peripheral 100 connects a CPU (Central Processing Unit) 201, a ROM (Read Only Memory) 202, a RAM (Random Access Memory) 203, a HDD (Hard Disk Drive) 204, a driver 205 corresponding to each driving unit, and an external interface 206 via internal bus 207.

For instance, the CPU 201 uses the RAM 203 as a working area, executes programs stored in the ROM 202 and the HDD 204, sends and receives data, instructions, signals and commands from the external interface 206, and controls the workings of respective driving units shown in FIG. 1.

On the other hand, the external interface 206 connects with a terminal device 200 so as to communicate via network, and a control circuit of the terminal device 200 is provided with a CPU, a ROM, a RAM, a HDD, and an external interface, not shown in the drawing. The function of each unit is the same as above.

Respective units described later except the driving unit (shown in FIG. 3) can be materialized by executing the respective programs by the CPU. The programs and data for materializing the undermentioned units are stored in the ROM, the RAM, and the HDD.

Figure 3:
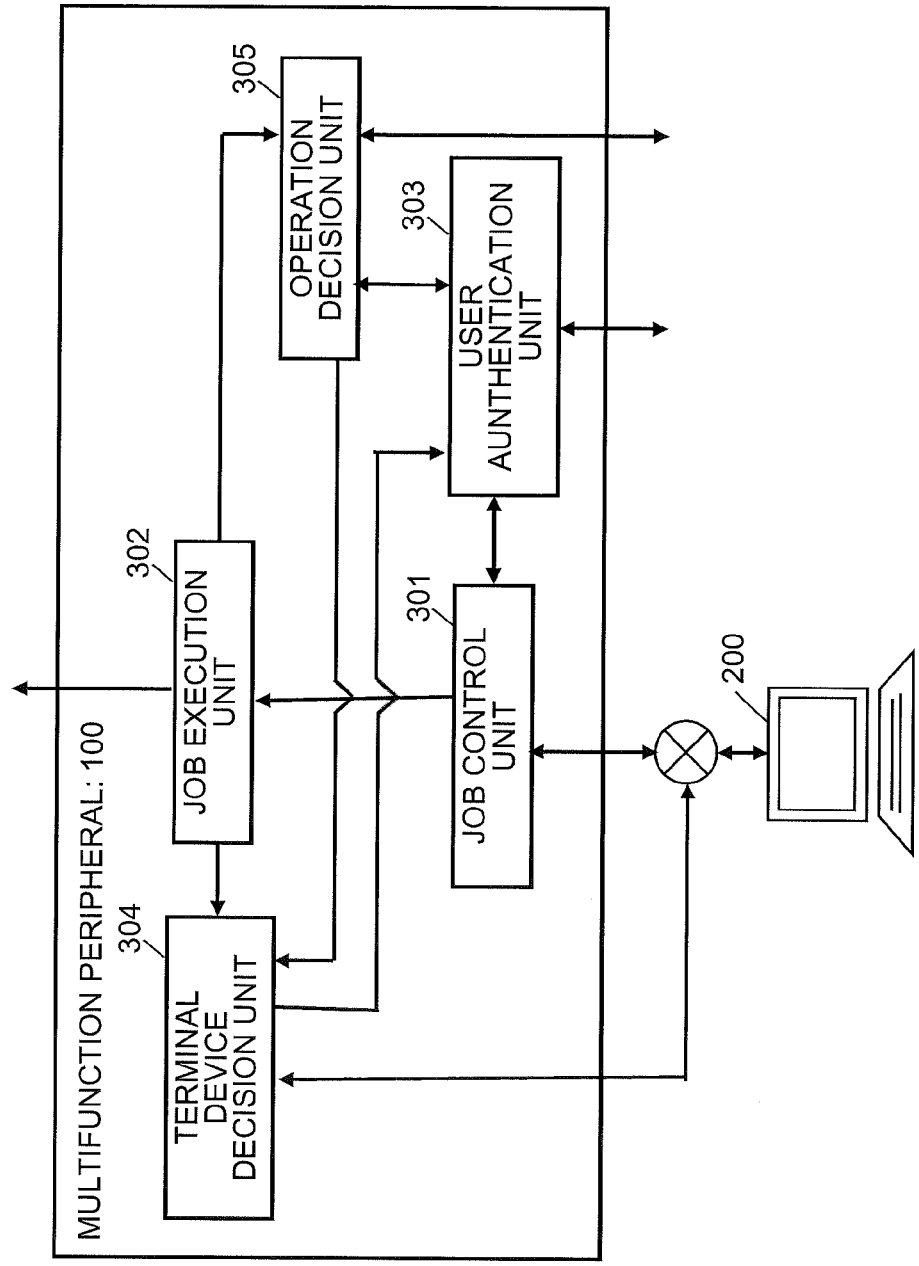
FIG. 3 is a functional block diagram of the multifunction peripheral in accordance with an embodiment of the present disclosure.

The structure and the execution steps in accordance with the embodiment of the present disclosure are explained with reference to FIG. 3 and FIG. 4.

First, the user creates the print job for printing a specific document (e.g. "document A") including image data by his terminal device 200 located at his working place such as a company or an office, and changes the print job to the private print job by imparting the user identification information (e.g. "AAA") to the print job. The private print job is a print processing executed based on an instruction from a terminal device, and the print processing wherein the user executes the actual printing on the image forming apparatus after he has sent the print instruction and the image data of the print data from the user terminal device.

The print job may be changed to the private job by automatically imparting the user identification information of the user using the terminal device 200 to the print job being in progress, when the user selects a private print job key on a screen for creating the print job.

Further, according to the screen of the terminal device 200, the user selects the multifunction peripheral 100 that is placed in the company and connects with the terminal device 200 so as to communicate with each other. The user sends the print job to the multifunction peripheral 100. A job control unit 301 of the multifunction peripheral 100 receives the print job (FIG. 4: S101), and decides whether or not the received print job is the private print job (FIG. 4: S102).

Specifically, the job control unit 301 may decides whether or not the user identification information of a specific user is imparted to the print job.

Figure 4:
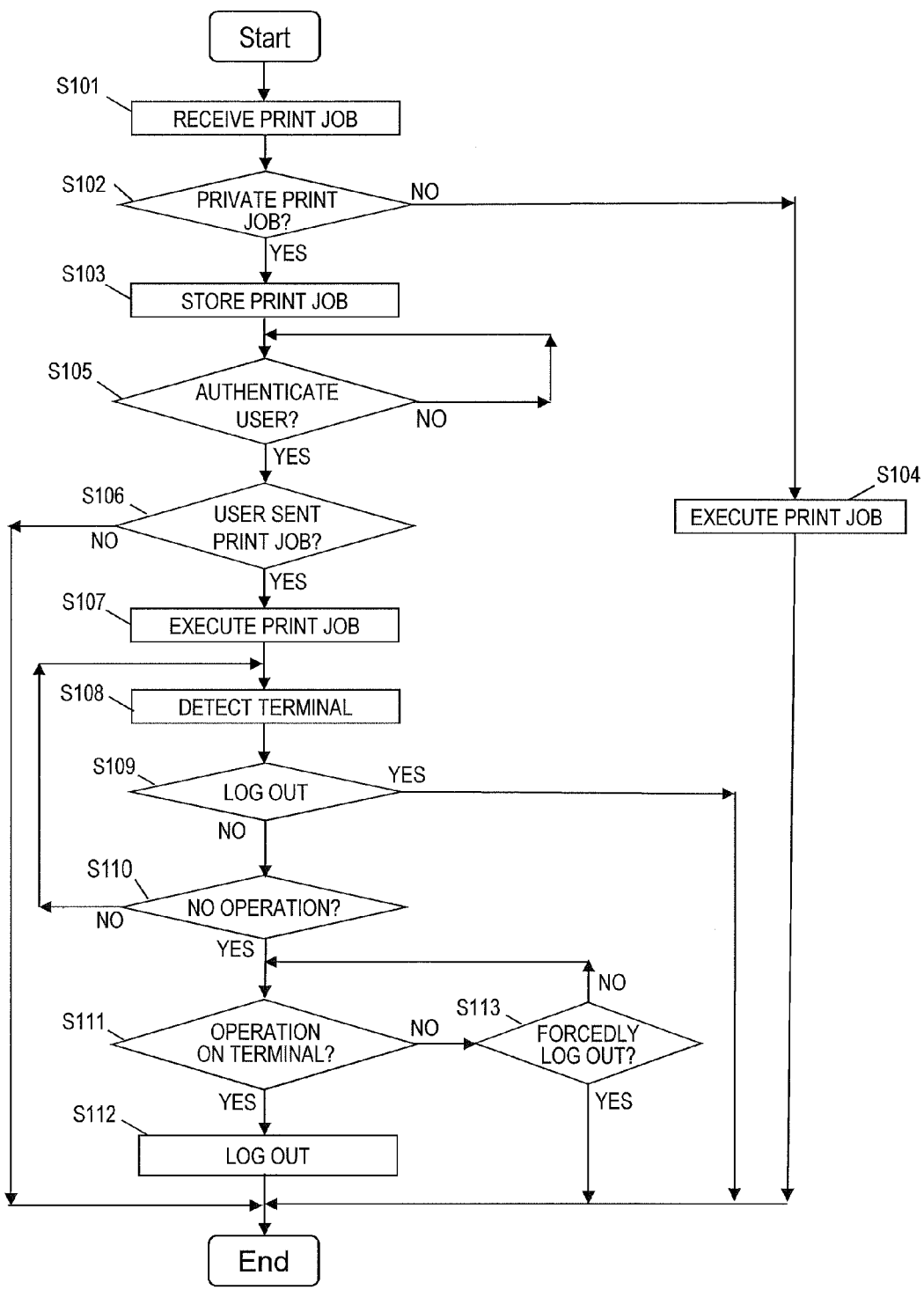
FIG. 4 is a flowchart indicating execution steps in accordance with an embodiment of the present disclosure.

When the received print job is the private print job (FIG. 4: S102 YES), the job control unit 301 temporarily stores the print job being associated with the user identification information ("AAA") in a private print table 500 in a specific memory (FIG. 4: S103).

Figures 5A, 5B:
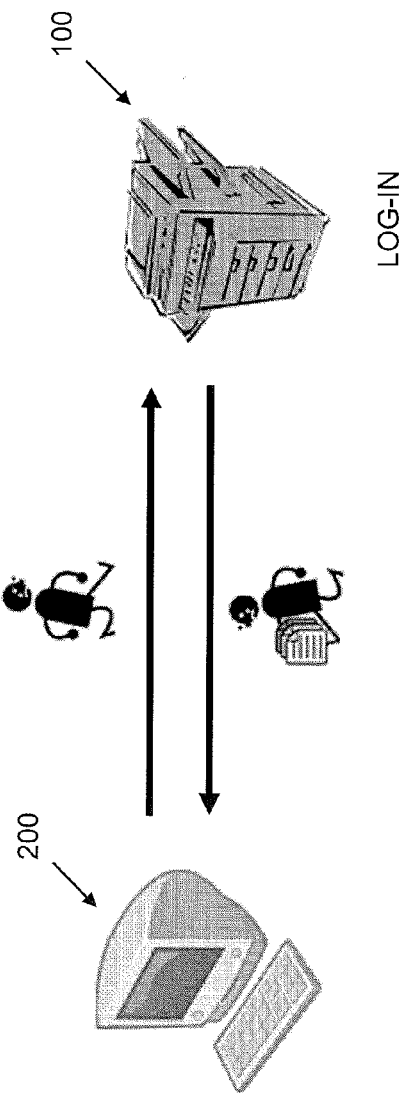
FIG. 5A is a diagram indicating an example of a private print table in accordance with an embodiment of the present disclosure.
FIG. 5B is a diagram indicating a relation of the multifunction peripheral, a terminal device, and a user when the user forgot to log out.

As shown in FIG. 5A, a private print job 501 (a "Document A") is stored in the private print table 500 being associated with a user identification information 502 ("AAA"). Hereby, the private print job is temporarily retained.

On the other hand, when the user does not change the print job in progress to the private print job and sends the print job to the multifunction peripheral 100 as a normal print job, the job control unit 301 decides that the received print job is not the private print job (FIG. 4: S102 NO). The job control unit 301 notifies a job execution unit 302 of the decision result. Upon receipt of the notice, the job execution unit 302 immediately executes the received print job (FIG. 4: S104).

When the user sends the multifunction peripheral 100 the print job as the private print job, the user leaves from the terminal device 200 and goes to the multifunction peripheral 100, and operates the multifunction peripheral 100 to execute the print job, as shown in FIG. 5B.

Specifically, when the user goes to the multifunction peripheral 100, inputs his identification information ("AAA") and password (e.g. "aaa") in the multifunction peripheral 100, and presses down a login key. As the inputting method of the user identification information ("AAA") and password (e.g. "aaa"), the user may allow a card reader provided to the operation unit 101 to read a user card (IC card) of the user, or the user may input his identification information ("AAA") and his password ("aaa") by operating the operation unit 101.

A user authentication unit 303 in the multifunction peripheral 100 receives the input of the user identification information and password, and authenticates the user based on the inputted user identification and password and the registered user identification and password (FIG. 4: S105).

When the inputted user identification information ("AAA") and password ("aaa") are identical with the registered identification information and password, the user authentication unit 303 allows the user to log in (FIG. 4: S105 YES).

On the other hand, when the inputted user identification information ("AAA") and password ("aaa") are not identical with the registered identification information and password, the user authentication unit 303 deletes the inputted user identification information and password, and requests the user to input a proper user identification information and password (FIG. 4: S105 NO).

After the user login, the user authentication unit 303 notifies the job control unit 301 of the login of the user. Upon receipt of the notice, the job control unit 301 decides whether or not the login user sends the private print job (FIG. 4: S106).

That is, the job control unit 301 refers to the private print table 500, and decides whether or not the identification information ("AAA") of the login user exists in the identification information 502 of the private print table 500. When the identification information of the login user exists in the identification information 502 of the private print table 500, the job control unit 301 decides that the login user sends the private print job. When the identification information of the login user does not exist in the identification information 502 of the private print table 500, the job control unit 301 decides that the login user does not send the private print job.

When the login user does not send the private print job (FIG. 4: S106 NO), the user places the original on the original plate of the multifunction peripheral 100, and inputs an instruction of reading an image of the original by the operation unit 101. The multifunction peripheral 100 reads the image of the original based on the instruction and executes the print job of the image data. At this time, the multifunction peripheral 100 waits for the user instruction and then executes the instructed job.

When the login user has sent the private print job (FIG. 4, S106 YES), the job control unit 301 notifies the job execution unit 302 of the private print job. Upon receipt of the notice, the job execution unit 302 executes the private print job of the login user (FIG. 4: S107).

The method of executing the private print job by the job execution unit 302 is not limited in particular. For instance, the job execution unit 302 obtains the private print job 501 corresponding to the identification information 502 identical with the identification information of the login user from the private print table 500, and outputs the printed matter based on the image data ("Document A") of the private print job 501. In this way, the user makes the multifunction peripheral 100 execute the private print function. Besides, after the job execution unit 302 ends the private print job 501, the private print job 501 and the corresponding identification information 502 are deleted from the private print table 500.

Here, the job execution unit 302 has ended the private print job, and notifies a terminal device decision unit 304 of the execution. Upon receipt of the notice, the terminal device decision unit 304 detects the terminal device 200 of the user corresponding to the executed private print job (FIG. 4: S108).

For instance, the terminal device decision unit 304 may detect an origin of the private print job as the user terminal device 200.

Otherwise, the user identification information is stored in advance being associated with the identification information of the terminal device 200 that the user uses, and the user terminal device 200 may be detected by means of the stored information. Specifically, the terminal device decision unit 304 refers to a user terminal device table 600 stored in the specific memory.

Figure 6A:
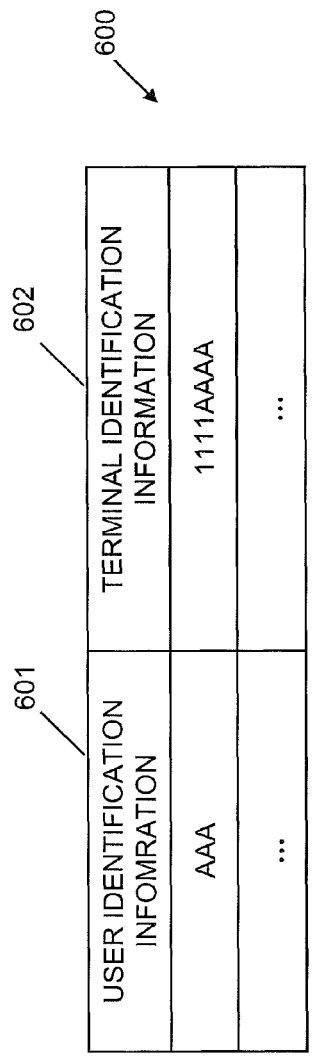
FIG. 6A is a diagram indicting an example of a user terminal device table in accordance with an embodiment of the present disclosure.

As shown in FIG. 6A, the user terminal device table 600 stores the user identification information ("AAA") 601 being associated with the terminal identification information ("1111AAAA") 602 of the terminal device that the user always uses. The terminal identification information 602 is a fixed address, such as an IP address or a MAC address, that is able to specify the terminal device 200 connecting with the network. The terminal device decision unit 304 checks the user identification ("AAA") corresponding to the private print job and the user identification information ("AAA") in the user terminal device table 600, and obtains the terminal identification information ("1111AAAA") 602 corresponding to the user identification information 601 in the user terminal device table 600. The terminal device decision unit 304 detects a specific terminal device on the network as the user terminal device 200 based on the terminal identification information ("1111AAA") 602.

In addition, after the private print job has ended, the job execution unit 302 notifies a operation decision unit 305 of the end of the private print job. Upon receipt of the notice, the operation decision unit 305 decides whether a user operation exists or not, in a state that the user does not log out (in a state of login) after the end of the private print job. (FIG. 4: S109 NO).

For instance, at the end of the private print job, the operation decision unit 305 communicates with the user authentication unit 303 and decides whether or not the user logs out (FIG. 4: S109).

Here, when the user inputs the logout key by operating the operation unit 101 without fail, the user authentication unit 303 executes the logout. In this case, the operation decision unit 305 decides that the logout of the user is executed (FIG. 4: S109 YES). In this case, the user appropriately executes the logout after the private print job is executed, so that there is no problem on the security.

On the other hands, as shown in FIG. 5B, it is assumed that the user takes away the printed matter corresponding to the private print job from the multifunction peripheral 100 without logging out after the private print job has ended. In this case, the operation decision unit 305 decides that the logout of the user is not executed (FIG. 4: S109 NO). And then, the operation decision unit 305 decides whether the user operation exists or not on the operation unit 101 (FIG. 4: S110).

Specifically, after the private print job was executed, the operation decision unit 305 communicates with the operation unit 101 or the job execution unit 302, and decides whether a user key operation except the logout exists or not. When the operation decision unit 305 decided that the user key operation does not exist, a job lapsed time that has lapsed after the end of the private print job is measured by a timer, and the operation decision unit 305 decides whether or not the job lapsed time is over a predetermined no-operation time (a specific time). When the no-operation unit decided that the user key operation exists, an operation lapsed time that has lapsed after a preceding key operation is measured by the timer, and the operation decision unit 305 decides whether or not the operation lapsed time is over the no-operation time.

In the above description, since the operation decision unit 305 decides whether the user key operation except the logout exists or not, it is not possible to decide whether the user executing the key operation is the login user or the other. It is assumed that the user executing the key operation within the no-operation time is the login user, and the operation decision unit 305 executes the decision.

In case of deciding that the user operation does not exist, there is a relation between the no-operation time and a time that the user is back to the terminal device 200 from the multifunction peripheral 100 without logging out. For instance, a reference distance between the multifunction peripheral 100 and the user terminal device 200 and an actual distance between the multifunction peripheral 100 and the user terminal device 200 have been registered in advance in the memory. Depending on the distances thus registered, the operation decision unit 305 may prolong or shorten the no-operation time. Where the actual distance is larger than the reference distance registered in advance (for example, 1 m), the operation decision unit 305 may employ the no-operation time that is longer than a specific time (for example, a few seconds) determined based on the reference distance. Where the actual distance is smaller than the reference distance, the operation decision unit 305 may employ the no-operation time that is shorter than the specific time. Hereby, it is possible to appropriately decide that the user operation does not exist, considering the time the user returns to the terminal device 200 from the multifunction peripheral 100.

When the user performs the key operation except the logout before the lapsed time is over the no-operation time, it means that the user is working at the multifunction peripheral 100. Accordingly, the operation decision unit 305 decides that the user operation exists (FIG. 4: S110 NO), and then decides whether the user executes the logout or not (FIG. 4: S109). Hereby, it is possible to prevent the execution of the unintentional logout when the user in the middle of the working left from the multifunction peripheral 100 for a short time but be back soon. Besides, when the user operation exists, the operation decision unit 305 resets the measured operation lapsed time, and measures again the operation lapsed time that has lapsed after the preceding key operation by the user.

On the other hand, when the user left from the multifunction peripheral 100 without logging out, the lapsed time is over the no-operation time. At this time, the operation decision unit 305 decides that the user operation does not exist (FIG. 4: S110 YES), and notifies the terminal device decision unit 304 of the result. Upon receipt of the notice, the terminal device decision unit 304 decides whether the user operation exists or not on the user terminal device 200 sent the private print job (the detected user terminal device) (FIG. 4: S111)

The terminal device decision unit 304 communicates with the user terminal device 200 corresponding to the terminal identification information ("1111AAAA") 602, and periodically decides whether a mouse operation or a keyboard operation exists or not on the user terminal device 200. The terminal device 200 is generally configured to shift from the normal mode to the sleep mode (or the screen saving mode), or make the user log out, when the no-operation state of the terminal device 200 is continued for a predetermined time. Under such modes, when the user operates the terminal device 200, the terminal device 200 cancels the sleep mode (the screen saving mode) or allows the user to log in the terminal device 200 again by the user operation. Therefore, if the terminal device 200 is under the sleep mode when the terminal device decision unit 304 decides whether the user operation exists or not on the user terminal device 200, the terminal device decision unit 304 cancels the sleep mode and then executes the decision. If the terminal device 200 has made the user log out when the terminal device decision unit 304 decides whether the user operation exists or not on the user terminal device 200, the terminal device decision unit 304 decides that the user operation exists on the terminal device 200 at the time that the user logs in again. It is assumed that the terminal device 200 is a desktop type device, but when it is a touch panel type device, a touch of the user to a touch panel may be considered as the user operation.

Figure 6B:
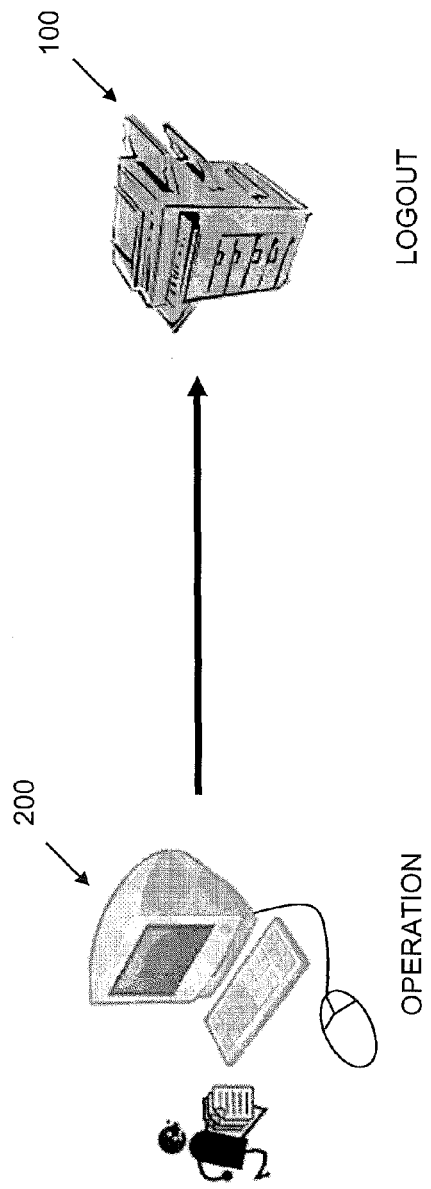
FIG. 6B is a diagram indicating a relation of the multifunction peripheral, a terminal device, and a user when the logout is executed automatically.

As shown in FIG. 6B, when the user operates the mouse of the user terminal device 200, it is decided at S111 that the user operation exists on the user terminal device 200 (FIG. 4: S111 YES). The terminal device decision unit 304 decides that the user is back to the user terminal device 200, and notifies the user authentication unit 303 of the result. Upon receipt of the notice, the user authentication unit 303 makes the user log out from the multifunction peripheral 100 (FIG. 4: S112). Accordingly, even when the user forgot to log out from the multifunction peripheral 100 for some reason, the multifunction peripheral 100 automatically makes the user log out form the multifunction peripheral 100, so that it is possible to prevent the long login state that the user does not intend, and the problem on the security can be settled. In addition, since the special equipment is not required like the conventional techniques, the high cost performance can be obtained.

In case where the user operation does not exist on the user terminal device 200 (FIG. 4: S111 NO), the terminal device decision unit 304 decides that the user is not back to the user terminal device 200, communicates with the user authentication unit 303, and decides whether a forced logout is executed or not on the multifunction peripheral 100 (FIG. 4: S113).

The forced logout means that the user authentication unit 303 makes the login user log out forcedly because of any trigger event. For instance, in a state that the user logs in the multifunction peripheral 100, the other user logs in the multifunction peripheral 100. At this time, the user authentication unit 303 makes the prior user log out from the multifunction peripheral 100 (cancel the login). Hereby, it is possible to allow the other user to use the multifunction peripheral 100, and prevent the continuation of the login state of the prior user for a long time.

When the forced logout is not executed (FIG. 4: S113 NO), the step returns to S111, and the terminal device decision unit 304 decide whether the user operation exists or not on the user terminal device 200 (FIG. 4: S111).

On the other hand, when the forced logout is executed (FIG. 4: S113 YES), the terminal device decision unit 304 need not to decide about the user operation on the terminal device 200, and terminates the processing.

As described above, it is possible in the present disclosure to prevent the user from forgetting to log out after the operation.

Besides, in the embodiments of the present disclosure, the automatic logout device is explained as the device installed in the image forming apparatus and the job sent from the terminal device connected with the image forming apparatus via network is explained as the private print job, but the automatic logout device may be applied to the user authentication apparatus wherein there is a possibility that the user forgets to log out after the operation. The job may be any job that the user authentication apparatus executes. The job is not limited to the print job or the private print job.

Moreover, the embodiment of the present disclosure, the multifunction peripheral 100 having the automatic logout device is configured to include each unit, but it may be configured that a program for materializing the units is stored in a storage medium and the storage medium is provided. In such configuration, the program is read on the automatic logout device, and the automatic logout device materializes the respective units. In this case, the program read from the storage medium provides the effect of the present disclosure. Additionally, the steps executed by the respective units may be stored in the hard disk.

Therefore, the automatic logout device in the present disclosure is useful not only to the multifunction peripherals but also the electronic apparatus that performs the user authentication, such as copy machines, printers, terminal devices, and tablet type terminal devices.

What is claimed is:

1. An automatic logout device installed in an electronic apparatus connecting with a user terminal device via a network, comprising:
    an operation decision unit configured to decide whether a user operation exists or not on the electronic apparatus when a user instructing a job did not log out from the electronic apparatus after the job ended by the electronic apparatus;
    a memory configured to store a reference distance between the electronic apparatus and the user terminal device and an actual distance between the electronic apparatus and the user terminal device;
    a terminal device decision unit configured to decide whether the user operation exists or not on the user terminal device when it is decided that the user operation does not exist on the electronic apparatus; and
    an authentication unit configured to make the user log out from the electronic apparatus when it is decided that the user operation exists on the user terminal device;
    wherein the operation decision unit decides whether or not a job lapsed time after the end of the job is over a predetermined no-operation time when a user key operation except the logout does not exist, or whether or not an operation lapsed time after a preceding user key operation is over the no-operation time when the user key operation exists, and decides that the user operation does not exist when the job lapsed time or the operation lapsed time is over the no-operation time, and
    the no-operation time to be employed by the operation decision unit is longer than a time determined based on the reference distance when the actual distance is larger than the reference distance, and shorter than the time determined based on the reference distance when the actual distance is smaller than the reference distance.

2. The automatic logout device according to claim 1, wherein
    the operation decision unit decides whether the user logs out from the electronic apparatus or not after the end of the job, and decides whether the user operation exists or not when the user did not log out from the electronic apparatus.

3. The automatic logout device according to claim 1, wherein
    the operation decision unit resets the operation lapsed time when the user key operation except the logout exists within the no-operation time, and decides whether or not the operation lapsed time after the execution of the preceding user key operation is over the no-operation time.

4. The automatic logout device according to claim 1, wherein
    the terminal device decision unit detects an origin of the job as the user terminal device, communicates with the user terminal device via the network, and periodically decides whether a mouse operation or a keyboard operation exists or not on the user terminal device.

5. The automatic logout device according to claim 1, wherein
    the terminal device decision unit detects an origin of the job as the user terminal device, communicates with the user terminal device via the network, and decides that the user operation exists when a sleep mode of the user terminal device is canceled.

6. The automatic logout device according to claim 1, wherein
    the terminal device decision unit detects an origin of the job as the user terminal device, communicates with the user terminal device via the network, and decides that the user operation exists when the user logs in the terminal device again after the terminal device made the user log out.

7. The automatic logout device according to claim 1, wherein
    the terminal device decision unit refers to a terminal device table storing a user identification information being associated with a terminal identification information of the user terminal, communicates with the user terminal device via the network, and periodically detects whether a mouse operation or a keyboard operation exists or not on the user terminal device having the terminal identification corresponding to the user identification information.

8. The automatic logout device according to claim 1, wherein the terminal device decision unit terminates a decision processing when the user operation does not exist on the user terminal and the user is made to forcedly log out due to the login of an-other user.

9. An automatic logout device installed in an image forming apparatus connecting with a user terminal device via network comprising:
    a user authentication unit for allowing a user to log in the image forming apparatus when user identification information and password inputted from an operation unit of the image forming apparatus by the user are identical with registered user identification and password;

a job control unit for deciding whether or not the user identification of the login user corresponds to the registered user identification information of a private print job temporally stored in a memory;

a job execution unit for executing the private print job when the user identification information of the login user corresponds to the registered user identification information of the private print job;

an operation decision unit for deciding whether a user operation exists or not on the image forming apparatus when the user instructing the private print job did not log out from the image forming apparatus after an end of the private print job;

a memory configured to store a reference distance between the image forming apparatus and the user terminal device and an actual distance between the image forming apparatus and the user terminal device; and a terminal device decision unit for deciding whether the user operation exists or not on the user terminal device when it is decided that the user operation does not exist on the image forming apparatus;

wherein an authentication unit makes the user log out from the image forming apparatus when it is decided that the user operation exists on the user terminal device, the operation decision unit decides whether or not a job lapsed time after the execution of the job is over a predetermined no-operation time when a user key operation except the logout does not exist, or whether or not an operation lapsed time after the execution of a preceding user key operation is over the no-operation time when the user key operation exists, and decides that the user operation does not exist when the job lapsed time or the operation lapsed time is over the no-operation time, and the no-operation time to be employed by the operation decision unit is longer than a time determined based on the reference distance when the actual distance is larger than the reference distance, and shorter than the time determined based on the reference distance when the actual distance is smaller than the reference distance.

10. An automatic logout method for an electronic apparatus connecting with a user terminal device via network, comprising:

an operation decision step configured to decide whether a user operation exists or not on the electronic apparatus when a user instructing a job did not log out from the the electronic apparatus after an end of the job;

a memory storing step configured to store a reference distance between the electronic apparatus and the user terminal device and an actual distance between the electronic apparatus and the user terminal device;

a terminal device decision step configured to decide whether the user operation exists or not on the user terminal device when it is decided that the user operation does not exist on the electronic apparatus; and an authentication step configured to make the user log out from the electronic apparatus when it is decided that the user operation exists on the user terminal device;

wherein the operation decision step decides whether or not a job lapsed time after the end of the job is over a predetermined no-operation time when a user key operation except the logout does not exist, or whether or not an operation lapsed time after a preceding user key operation is over the no-operation time when the user key operation exists, and decides that the user operation does not exist when the job lapsed time or the operation lapsed time is over the no-operation time, and the no-operation time to be employed by the operation decision unit is longer than a time determined based on the reference distance when the actual distance is larger than the reference distance, and shorter than the time determined based on the reference distance when the actual distance is smaller than the reference distance.

* * * * *